United States Patent [19]

Southall

[11] 4,347,208  
[45] Aug. 31, 1982

[54] METHOD OF MAKING FILTER CELL HAVING SEALED PERIPHERY

[75] Inventor: Kenneth Southall, Wethersfield, Conn.

[73] Assignee: AMF Incorporated, White Plains, N.Y.

[21] Appl. No.: 253,345

[22] Filed: Apr. 13, 1981

[51] Int. Cl.³ .............................................. B29C 6/04
[52] U.S. Cl. .................................. 264/229; 264/250; 264/258; 264/263; 264/DIG. 48
[58] Field of Search ............... 264/263, 252, DIG. 48, 264/296, 320, 324, 229, 250, 258, 277

[56] References Cited

U.S. PATENT DOCUMENTS

| | | | |
|---|---|---|---|
| 618,965 | 2/1899 | Theurer | 264/271 |
| 2,788,901 | 4/1957 | Boeddinghaus et al. | 210/486 |
| 3,082,587 | 3/1963 | Brimberg | 264/DIG. 48 |
| 3,124,630 | 3/1964 | Ronning et al. | 264/266 |
| 3,148,233 | 9/1964 | Gits | 264/161 |
| 3,183,285 | 5/1965 | Boylan | 264/DIG. 48 |
| 3,362,302 | 1/1968 | Friedman | 93/35 |
| 3,387,075 | 6/1968 | Wilcox | 264/263 |
| 3,397,518 | 8/1968 | Rogers | 55/497 |
| 3,408,438 | 10/1968 | Staunton | 264/252 |
| 3,420,725 | 1/1969 | Curry | 156/305 |
| 3,471,019 | 10/1969 | Trasen et al. | 210/94 |
| 3,782,083 | 1/1974 | Rosenberg | 55/491 |
| 3,803,810 | 4/1974 | Rosenberg | 55/159 |
| 3,807,146 | 4/1974 | Witkowski | 264/252 |
| 3,954,625 | 5/1976 | Michalski | 210/445 |
| 4,096,228 | 6/1978 | Decker | 264/271 |
| 4,113,627 | 9/1978 | Lesson | 210/446 |
| 4,193,876 | 3/1980 | Leeke et al. | 156/305 |

Primary Examiner—James B. Lowe  
Attorney, Agent, or Firm—David E. Dougherty; Michael Zall

[57] ABSTRACT

A method is provided for making a filter cell comprised of two cellulosic fiber containing filter media having a sealed periphery. The method comprises compressing the peripheries of each filter media, to form a flange. The media are then aligned to provide intimate face-to-face contact between the flanges. A spacer means is provided between the media to cause each to dish outwardly from the other media. The two media and spacer means are then placed into a mold surrounding the flanges. The mold has a means for providing a recompression force to the inner portions of the flanges. A thermoplastic polymer is then injected into the mold to form a seal around the flanges. The recompression force is sufficient to maintain the flanges in intimate face-to-face contact with each other and to prevent seepage of the polymer between the flanges when the polymer is injected into the mold. The sealed periphery is reliable, economical to produce, resistant to cracking, provides enhanced support for the filter media, and permits the production of a filter cell having low extractables.

11 Claims, 3 Drawing Figures

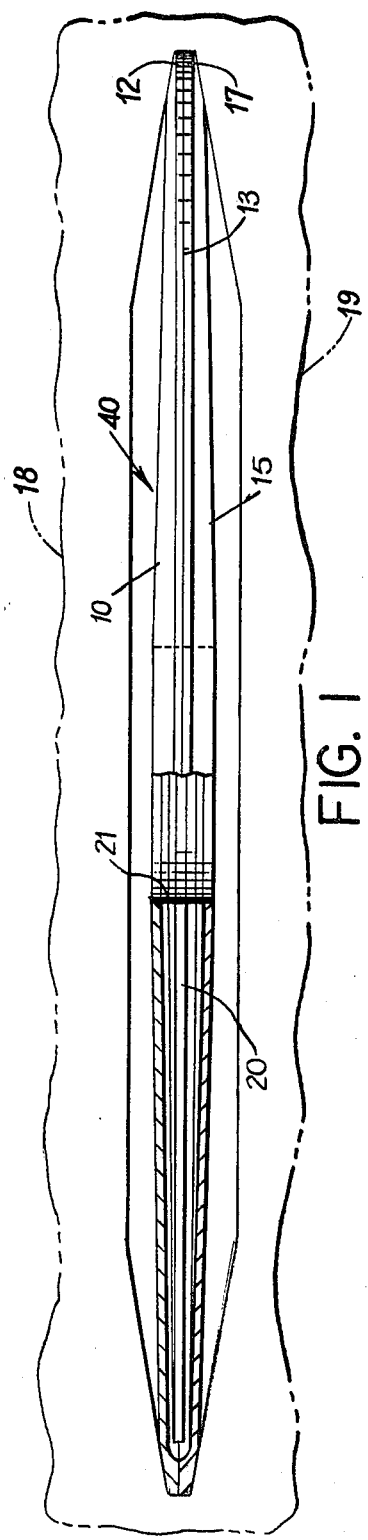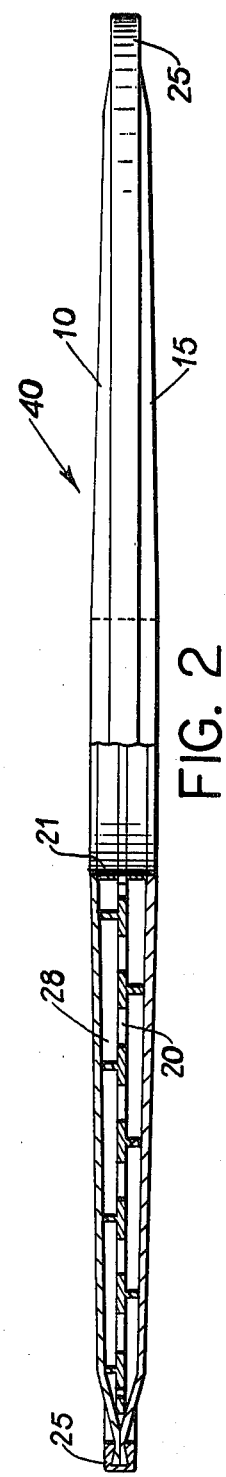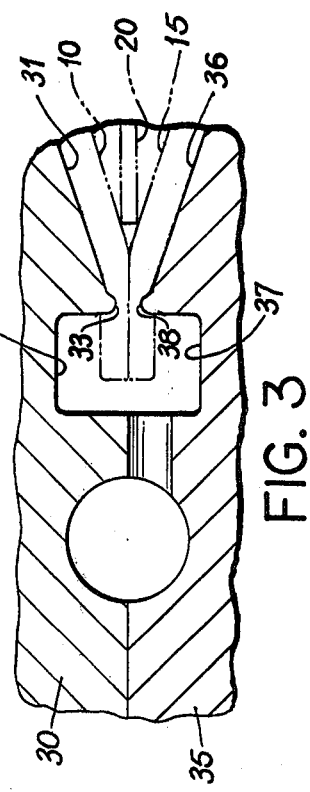

METHOD OF MAKING FILTER CELL HAVING SEALED PERIPHERY

BACKGROUND OF THE INVENTION

1. Field of the Invention

This invention relates generally to filter cells, and, more particularly to an improved method of making a filter cell having a sealed periphery.

2. Prior Art

Preferred type filter cells produced by the present invention are described in U.S. Pat. No. 2,788,901 to Boeddinghaus et al, particularly FIGS. 6 and 9. This reference describes filter cells in rectangular and disc form. Such cells may be used in groups (as shown in FIGS. 6 and 7 of this reference) or singularly (as shown in FIGS. 3 and 5 of this reference) to form a filter cartridge. The entire disclosure of Boeddinghaus et al is incorporated herein by reference. Probably the most outstanding problems in making such filter cells, is sealing the peripheral edges. Boeddinghaus et al describes a procedure whereby the edges of the two filter media forming the filter cell are fused by heat and pressure applied to the peripheries of the filter media. The fusing material is a thermoplastic polymer which forms a part of the filter media. Such a procedure may be highly desirable when such thermoplastic polymer forms a part of the filter media, but is useless when the filter media is comprised of a cellulosic material which may also contain, for example, inorganic particulate.

Another procedure used, is to sew the peripheral edges of the filter media together. This method of sealing the edges of the filter cell is time consuming and results in filter cells which tend to leak between the stitches.

Another method which has been used to seal the peripheral edges of a filter cell is to provide a thermoplastic separator between the filter media which extends between the edges of the filter media. When the edges of the filter media are heated under pressure the thermoplastic separator bonds the filter media together. This method is suitable for cellulosic as well as noncellulosic type filter media. The disadvantage of this method is that the seal tends to be unreliable due to delamination along the periphery of the filter cell.

Another method which has been used to seal the peripheral edges of a filter cell, is applying an extruded "L" shaped edge seal to the peripheral edge of the filter cell. The horizontal portion of the seal is placed in contact with one of the filter media on one side of the cell. The vertical portion of the seal is then formed over the other filter media on the opposite side of the cell. This results in a "U" shaped edge seal. Such a procedure for sealing the periperhal edges of a filter cell, has not been successful for the molded edge seal is expensive, the vertical portion of the "L" shaped edge seal tends to spring back when pressed against the upper filter media and also tends to stick to the press which bends it over the upper filter media.

Another method used to seal the periphery of a filter cell is to dip the peripheral edges of the filter media in a thermosetting plastic, e.g. melamine formaldehyde, and then set the plastic with heat. This method is undesirable for it produces a filter cell having measurable extractables, a property which is undesirable in the use of such filters for foods, pharmaceuticals and parenteral fluids. Additionally, such a method makes the edges of the filter cell highly brittle causing, for example, radial cracks to form. Additionally, process parameters are critical and the fumes, for example from melamine formaldehyde, are undesirable pollutants.

Another method for sealing the peripheral edges of a filter cell uses an extruded polypropylene seal which is placed around the flanges of the filter cell. This method reduces extractables, but such a a seal is expensive and time consuming to properly place on the flanges of the filter media.

Still another method of sealing the peripheral edges of a filter cell is dipping the edges in a thermoplastic, for example, polyvinyl chloride, which has a plasticizer admixed therewith, and then allowing the filter cell to dry. This method produces a filter cell having high extraction levels making it unsuitable for critical food and pharmaceutical applications.

OBJECTS AND SUMMARY OF THE INVENTION

It is an object of this invention to provide a method of making a filter cell having a sealed periphery.

It is a further object to this invention to provide a method of making a filter cell having a sealed periphery which does not contribute to the extractables obtained from the filter cell.

It is a further object of this invention to provide a method of making a filter cell having peripheral edges which are comparatively flexible and do not crack during manufacture, shipping, storage and use.

It is a further object of this invention to provide a method for producing a filter cell which is economical and has a sealed periphery which is reliable.

The foregoing objects, as well as other objects are obtained by the method of this invention.

The method of this invention is directed to making a filter cell having a sealed periphery, the filter cell being comprised of two filter media. The method comprises:

(a) compressing the peripheries of each media, to form a flange at the periphery of each media;

(b) aligning the two media to provide intimate face-to-face contact between the flanges;

(c) providing a spacer means between the media with a profile which causes each of the filter media within its flange to dish outwardly from the other media when the flanges are brought into intimate face-to-face contact;

(d) placing the two media with the spacer means therebetween into a mold which surrounds the flanges, the mold having a means for providing a recompression force to the inner portions of the flanges; and (e) injecting into the mold a thermoplastic polymer to form a seal around the two flanges.

The recompression force is sufficient to maintain the flanges in intimate face-to-face contact with each other and to prevent seepage of the polymer between the flanges.

The aforementioned method produces a filter cell having a reliable sealed periphery. The cell is economical to produce, and has a flexible seal so that cracking during manufacture, shipping, storage and use is prevented. The filter cell provides enhanced support for the filter media and substantially undetectable extractables.

BRIEF DESCRIPTION OF THE DRAWING

FIG. 1, is an elevational view, half in section, depicting a preferred embodiment of a disc type filter cell after the flange portions having been formed and while still in the compression press;

FIG. 2, is an elevational view, half in section, depicting a preferred embodiment of a completed disc type filter cell made in accordance with the present invention; and FIG. 3, in an enlarged fragmentary sectional view of an injecting molding die which may be used in the method of this invention for forming the preferred edge seal around the peripheral edge of the filter cell.

DETAILED DESCRIPTION OF THE INVENTION

Referring to FIGS. 1 and 2, the filter cell, generally designated (40), produced by the method of this invention is comprised of two filter media (10 and 15), preferably in disc form, having their flanges (12 and 17) in intimate face-to-face contact with each other. The filter media (10 and 15) are separated by a spacer means or separator (20). The filter media (10 and 15) and the spacer means (20) all have an axial or central opening (21) of the proper size which form a vertical discharge passage (not shown). In operation, the fluid is filtered by passing from the outside of the filter cell (40), through the filter media (10 and 15) to the space (28) formed by spacer means (20). Contaminants are deposited on the outside of filter media (10 and 15) and the filtrate discharged through the discharge passage which is in fluid connection with space (28) between the media (10 and 15).

The preferred filter media (10 and 15) for use in the filter cell (40) contemplated by this invention, are of the type described in U.S. Pat. No. 4,007,113 and 4,007,114 to Ostreicher, and in copending applications U.S. Ser. No. 123,467 filed on Feb. 21, 1980, U.S. Ser. No. 164,797 filed on June 30, 1980 and U.S. Ser. No. 147,975 filed on May 8, 1980 all to Ostreicher and Hou. All of these aforementioned patents and applications are assigned to the assignee of this application. The entire disclosures of all of these patents and applications are incorporated herein by reference. Generally, these are cellulosic fiber and particulate type filter media, the surface of which has been charged modified. Such filter media and filter cells are sold under the trademark ZETA-PLUS by AMF Cuno, Meriden, Connecticut. This invention, however, is not to be limited to such filter media.

Generally, the preferred filter media used in this method are made into sheets from a slurry of cellulosic fiber and particulate filter aid (see for example, the aforementioned U.S. Ser. No. 123,467) and then cut into, for example, discs, by stamping or punching the appropriate shape out of the sheet. Such stamping simultaneously provides an axial or central opening (21).

The method of this invention comprises compressing the peripheries of each media (10 and 15) to form a flange (12 and 17) at the periphery of each media. The media (10 and 15) are then aligned with each other to provide intimate face-to-face contact between the flanges (12 and 17). Preferably this is carried out simultaneously.

Referring to FIG. 1, for example, a pair of filter media, preferably discs (10) and (15), are positioned in a suitble forming press between dies (18) and (19). The discs preferably have a spacer means or separator (20) between the media (10) and (15). It is not necessary to provide such separator (20) during the initial compressing of the peripheries of the media (10) and (15), although it is preferred.

The separator (20) may be made of an appropriate material, such as polypropylene. The separator (20) may be of any suitable type configuration well known in the art. The filter media (10) and (15) and the separator (20), if provided, are appropriately registered or aligned with each other. The forming press is operated causing the dies (18) and (19) to apply suitable pressure to the periphery of the pair of discs (10) and (15). Such a procedure simultaneously compresses or forms the flanges (12) and (17).

This procedure is similar to the precompression described in U.S. Pat. No. 4,193,876 to Leeke et al, the entire disclosure of which is incorporated herein by reference.

This compression densifies the media of the flanges (12 and 17), substantially removes various irregularities on the outer surface of the flanges and provides intimate face-to-face contact at the interface (13).

This compression step is a necessary element of the method of this invention, for it prevents flange delamination by the subsequent high pressure molding operation and also assists in preventing flaring of the periphery of the filter media produced by such molding operation.

Compression at the peripheries of the filter media (10 and 15) is accomplished so that cracking or imperfection in the filter media are eliminated or at the very least minimized. Preferably such compression is performed by impactless compression. By the use of the term "impactless compression", it is meant, for example, that the dies (18 and 19) are initially contacted with the peripheries of the filter media (10 and 15) and then slowly pressed against the periphery to the desired compression force to form the flanges (12 and 17). It has been found that an impactless compression force generally in the range of about 450 psi to about 2200 psi, is required to suitably simultaneously compact a pair of media and form the flanges of a 10.5 inch to 11.25 inch diameter disc filter media, each having an uncompressed thickness of about 0.15 inch. The actual compression force required is highly dependent upon the composition of the filter media, and in particular the ratio of the particulate material, which is substantially non-compressible, to the fibrous material, e.g. cellulosic fiber. Generally the higher the content of the particulate material, the higher the compression force required.

The amount of compression force may be determined by the spacing between dies (18) and (19). For example, two filter media discs (of practically any cellulose fiber/particulate composition) of the aforementioned dimensions may be compressed together to a thickness of about 0.050 to 0.090 inches at the outer flange edges. Preferably, the flanges are tapered for about 0.50 inches to the original thickness of the filter media, i.e. 0.300 inches, at the thickest flange dimension. Compression of the filter media to such dimensions essentially eliminates flange delamination and flaring during molding.

When the formed media are released from the press, the flanges (12) and (17) will tend to expand to a limited degree, i.e. spring back to about 10 to 15 percent, but will not return to their original thickness.

When the separator or spacer means (20) is included between the discs (10) and (15) in the press forming the flanges (12) and (17), the center portions of the filter media will dish outwardly from one another around the separator (20) due to the profile of the separator.

Referring to FIG. 3, the two media (10 and 15) with the spacer means (20) therebetween are then placed into a mold having molding dies (30 and 35). The mold surrounds the flanges (12 and 17). The mold has a means for providing a recompression force to the inner portions of the flanges (12 and 17).

More specifically, the mold is comprised of molding dies (30) and (35) which have matching concavities or walls (31 and 36) encircled by cooperating walls (32 and 37) which form an annular chamber to receive the thermoplastic material to be molded. Annular lip portion (33) is provided between the walls (31 and 32) while a similar lip portion (38) is provided between the walls (36 and 37). Lips (33) and (38) are aligned with one another and cooperate to provide a restricted opening between the cell forming chamber defined by walls (31) and (36)

When the filter cell assembly is put into the mold dies, the annular lips (33) and (38) exert a compressive force at the inner edge of the flanges (12) and (17), recompressing that portion of the flanges beyond the degree of initial compression resulting from the forming in the press. The recompression force is generally less than the molding pressure, e.g. 1000 to 5000 psi. This recompression maintains the flanges (12) and (17) in intimate face-to-face contact along the interface (13) and prevent seepage of the thermoplastic polymer molding material beteen the flanges (12 and 17) when the molded edge seal (25) is formed. If this recompression force is not applied to the filter media, the polymer used for molding will flow between the flanges of the filter media and extrude through the space (28), or to the outside of the filter media and/or the flanges will flare.

It should be fully understood that the force exerted by the lips (33) and (38) should not be excessive which could cause cutting, stratified separation or splaying of the flange material.

A thermoplastic polymer is then injected into the mold to form a molded edge seal (25) around the two flanges (12 and 17). Preferred polymers are polypropylene, polyethylene, nylon, polysulfone and generally any injection moldable thermoplastic material which is suitable for use in the particular filtration operation desired. Typically such plastics have a low extractables.

It is desirable that the step of injecting be performed under a pressure which provides a velocity of polymer impacting the flanges as it enters the mold which does not cause delamination or flaring of the flanges. Generally, for guidance, this pressure is from about 1000 to about 5000 psi, and preferably 2000 to 3000 psi. It should be noted, however, that such pressure depends upon the polymer used, the filter media, mold configuration and other factors. The amount of polymer used should be kept to a minimum to prevent excessive radial shrinkage of the molded edge seal (25) which may cause buckling of the filter media.

The aforementioned method of producing a filter cell produces a periphery seal around the filter cell which is reliable and flexible, so that cracking does not occur during manufacture, shipping, storage and use. The method is economical when compared to prior art methods of producing a filter cell, and enables a filter cell to be provided which has low extractables.

Although several embodiments of the invention have been illustrated and described in detail, it is to be expressly understood that the invention is not limited thereto. Various changes may be made in the design and arrangement of parts without departing from the spirit and scope of the invention as the same will now be understood by those skilled in the art.

What is claimed is:

1. A method of making a filter cell comprising two cellulosic fiber containing filter media, the filter cell having a sealed periphery, comprising:
   (a) compressing peripheries of each media to form a flange at the periphery of each media;
   (b) aligning the two media to provide intimate face-to-face contact between the flanges;
   (c) providing spacer means between the media with a profile which causes each of the filter media within its flange to dish outwardly from the other media when the flanges are brought into intimate face-to face contact;
   (d) placing the two media with the spacer means therebetween into a mold which surrounds the flanges, the mold having a means for providing a recompressing force to the inner portions of the flanges; and
   (e) injecting into the mold a thermoplastic polymer to form a seal around the two flanges,
   wherein the recompression force is sufficient to maintain the flanges in intimate face-to-face contact with each other and to prevent seepage of the polymer between the flanges when the polymer is injected into the mold.

2. The method of claim 1, wherein steps (a) and (b) are performed simultaneously by aligning the two media to provide intimate face-to-face contact between the peripheries of the media and compressing simultaneously the peripheries of the media to form a flange at the periphery of each media, the flanges being in intimate face-to-face contact with each other.

3. The method of claim 2, further comprising the step of:
   inserting the spacer means between the filter media prior to forming the flanges.

4. The method of claim 1 or 2, further comprising the step of:
   inserting the spacer means between the filter media after forming the flanges.

5. The method of claim 1, wherein the compressing step is performed by impactless compression.

6. The method of claim 1, wherein the spacer means is polypropylene.

7. The method of claim 1, wherein each of the media is in disc form.

8. The method of claim 5, wherein the impactless compression force is from about 450 psi to about 2200 psi.

9. The method of claim 1, wherein the injecting step is performed under a pressure which provides a velocity of polymer impacting the flanges which does not cause delamination or flaring of the flanges.

10. The method of claim 1, wherein the injecting steps is performed under a pressure of about 1000 psi to about 5000 psi.

11. The method of claim 1, wherein the injecting step is performed under a pressure of about 2000 psi to about 3000 psi.

* * * * *